Aug. 12, 1969   A. ABOLINS   3,460,862
COUPLING DEVICE FOR CONTAINER HANDLING SYSTEM
Filed June 12, 1967   6 Sheets-Sheet 1

INVENTOR
ANDREW ABOLINS
BY James Albert Drobile
ATTORNEY

INVENTOR
ANDREW ABOLINS
BY James Albert Drobile
ATTORNEY

INVENTOR
ANDREW ABOLINS
BY James Albert Drobile
ATTORNEY

United States Patent Office 3,460,862
Patented Aug. 12, 1969

3,460,862
COUPLING DEVICE FOR CONTAINER HANDLING SYSTEM
Andrew Abolins, Langhorne, Pa., assignor to Strick Corporation, Fairless Hills, Pa., a corporation of Pennsylvania
Filed June 12, 1967, Ser. No. 645,157
Int. Cl. B65j 1/10, 1/20
U.S. Cl. 294—82                8 Claims

ABSTRACT OF THE DISCLOSURE

Herein are disclosed new and improved coupling means, and container assemblies and an article handling device which embody same, for use in a system for handling container assemblies, and particularly for transferring container assemblies to and from highway carriers, railway carriers and other mobile and stationary structures. The container assemblies are either of the typical, removable-bogey, highway trailer body type, or are containers with separable chassis equipped with the customary equipment for highway transportation.

The article handling device is so constituted as to permit of: the lateral, sliding transfer of a container assembly from a railroad car or other supporting structure onto the handling device, and vice versa; the transporting of the container assembly while on the handling device from one location to another; and the vertical relocation of the container assembly from the handling device onto a highway wheel assembly and tractor or landing gear, or onto another supporting structure, and vice versa. A specific embodiment of the article handling device comprises: a frame equipped with wheels and adapted to be moved by integral or independent motive power means; a support member adapted at least for vertical movement relative to the frame; means for adjustably raising and lowering the support member; at least one transverse positioning or carriage member slidably-mounted on said support member; means for longitudinally positioning a container assembly supported by said carriage or positioning member on the support member; and coupling means on said handling device adapted for separable engagement with said container assembly.

The novel coupling means herein disclosed comprise interengageable means on the handling device and on the container assembly, whereby the container assembly can be separably connected to the handling device in an improved manner. The coupling means on the handling device comprises at least one downwardly-opening claw-shaped member pivotally-connected to the positioning means of said handling device, and the coupling means on said container assembly comprises a corresponding number of horizontally-extending, upwardly-opening, claw-receiving members secured to a side portion of said container assembly, and adapted by size and configuration for separable interengagement in pushing or pulling relation with said claw-shaped member. The portion of the positioning means to which the novel claw-shaped member is secured is movable vertically and rotatably about a transverse axis, through the use of suitable adjustment means, and said positioning means also is indirectly connected to at least the forward positioning or carriage member so as to vary the position of same on the support member. In a specific embodiment, the coupling means comprise a claw-shaped member secured to one end portion of each of two transversely-spaced, longitudinally-extendable and -retractable push/pull hydraulic rams rotatably mounted at their other ends to the frame about a transverse axis and provided intermediate their ends with means for adjusting the elevation of the end portions bearing sand claw-shaped member. Such embodiment also comprises a correspondingly-spaced pair of horizontally-extending claw-receiving members secured to the side surface of the container assembly near the bottom portion thereof. The claw-shaped member and the claw-receiving member are adapted in size and matching configurations for separable interengagement in either pushing or pulling relationship. The claw-receiving member preferably also is provided with a suitably-shaped recess to accommodate a conventional lifting device.

BACKGROUND OF THE INVENTION

In the modern day transportation of freight, livestock and people, it is common practice to employ highway, railway and marine carriers and combinations of all or some of them. For example, it is conventional to transport freight in a container equipped with a wheel assembly and other highway equipment and pulled by a highway tractor. Such a container, complete with its wheel assembly and landing gear, can be loaded upon a railroad car and transported by rail to a distant rail terminal, where it can be unloaded from the rail car and again connected to a highway tractor for further transport by highway means.

It also is common to employ a highway trailer body from which the highway wheel assembly is separable, or to employ a container from which both the highway wheel assembly and a bottom chassis embodying the landing gear and the like are separable. In these cases, a container without the highway wheel assembly, and either with or without the bottom chassis embodying the landing gear and other paraphernalia, also can be transported on railroad cars between rail terminals and recombined with the highway wheel assembly, and, if need be, with the bottom chassis, for further highway transfer.

Systems have been developed for facilitating transfer of a container from the highway wheel assembly and tractor, and with or without the bottom chassis, to a railroad car or other supporting structure, and vice versa. However, all such systems heretofore developed suffer from one or more of several disadvantages.

A new and improved system for handling container assemblies in and between highway and railway transport, and a new and improved handling device and railway car useful in the practice of such system, are disclosed and claimed in the application of Solomon Katz and Semond Levitt for U.S. Letters Patent filed concurrently herewith. The system and device therein disclosed are useful with containers of the removable-bogey type and either having permanently-attached kingpin, retractable landing gear and bogey positioning means, or having a separable supporting chassis which includes the kingpin, landing gear and bogey positioning means.

More particularly, the system disclosed by Katz and Levitt utilizes a novel handling device and novel railroad car construction, and involves vertically lifting the container assembly, normally with the underlying frame, kingpin and retractable landing gear, from the "bogey," or highway wheel assembly, and the tractor or landing gear by means of the handling device, and sliding same tranversely onto longitudinally-spaced, parallel, transverse skid members mounted on the upper portion of the railroad car. In accordance with this system, the container assembly also can be removed from the railroad car and placed on the bogey and tractor or landing gear by the handling device in substantially a reverse manner.

As noted, a railroad car useful in the aforementioned system is equipped with transverse skid members mounted thereon in a longitudinally-separated position and adapted to support the container assembly on the car in a laterallyslidable relationship. These skid members are shaped, and are space apart a sufficient longitudinal distance on the car, so that the container assembly is maintained in a substantially restrained longitudinal position on the railroad car. In addition, the skids support the container assembly at an elevation above the upper surface of the railroad car sufficient to prevent interference between the car and the various equipment appendages located under the container assembly. Releasable holding means also are provided on the car, for holding the container assembly in a fixed lateral position on the car until released. Depending upon the length of the container assemblies which are to be transported by rail, the car can accommodate one or more of them. To facilitate such flexibility, the skid members preferably are provided with releasable means for fastening them to the railroad car frame, and such means are adjustable so as to permit fastening to be accomplished at any desired location along the upper surface of the railroad car. Means also are provided for storing the skid members on the railroad car when not in use.

The novel handling device of Katz and Levitt comprises a rigid frame carrying a support member mounted to said frame and adapted through the provision of suitable elevating means to be raised or lowered, and preferably also to be rotated about a transverse axis, relative to the frame. Mounted transversely on this support member is a positioning or carriage member, adapted to carry a portion of the container assembly while undergoing longitudinally-slidable movement in relation to the support member through operation of suitable positioning means. Associated with this positioning or carriage member and the positioning means is coupling means adapted for separable engagement with the container assembly. A second positioning or carriage member, located to the rear in relation to the first and adapted for similar but more limited movement, preferably also is provided. By operation of the appropriate elevating means and the positioning means, and after engagement of the separable coupling means, the container assembly can be slidably removed from the railroad car skid members onto said positioning or carriage member or members on the support member, and in such position can be lowered onto a highway wheel assembly or other supporting structure positioned thereunder. The reverse sequence of operations can be followed in order to elevate a container assembly from a bogey and tractor or landing gear, and slidably transfer same to the railroad car.

By way of limitation, the shape of the handling device should be such as to permit of no interference when the device is maneuvered into the clearance space between the rear of the tractor and the front of the highway wheel assembly mounted in running position underneath the container assembly. Since container assemblies are fabricated in several conventional lengths, it will be apparent that for greatest flexibility the pertinent width of the handling device will be limited by a clearance space having relation to the smallest of such conventional container sizes with which it is intended to use such device, e.g., to that approximating twenty feet in over-all length.

The motive power means for the above handling device can be independently and separably constituted, as by a tractor of typical highway design, or can be integral with said handling device. In the former case, the tractor may consist of the same unit which has been or will be used in hauling the trailer or container assembly over the highway, by simply transferring the tractor from engagement with the container assembly to that with the handling device, and vice versa.

The various adjustment means, such as elevating or positioning means, which are employed in the handling device of Katz and Levitt conveniently can be constituted of suitable conventional elements or mechanisms. For example, hydraulically-actuated piston-and-cylinder mechanisms can be employed. In the latter case, one or more hydraulic systems including pump, piping and reservoir are provided inboard of the handling device, and there also is provided suitable conventional controls, such as valves, adapted to permit individual or conjoint variation of the adjustment means. Other conventional adjustment means, such as, for example, rack and pinion arrangements or screw and collar arrangements, can also be utilized, and with appropriate power transmission elements and conventional power sources.

The coupling means specifically disclosed in the aforesaid application of Katz and Levitt is integral with a positioning or carriage member, and by way of example comprises a plurality of transversely-spaced, generally-vertical tines separated by land portions and extending upwardly from a rear transverse portion of the forward positioning or carriage member. The dimensions and spacing of these tines are selected so as to permit of the easy upward insertion, from a position underneath the container assembly near the lower side portion thereof, of the upper portions of the tines between the longitudinally- and regularly-spaced, transverse, parallel sills underlying and supporting the floor of a container assembly of conventional design and construction. It will be apparent that with this type of coupling means, the width of the frame of the railroad car or other supporting structure must be significantly less than that of the superimposed container assembly, and the understructure of the container assembly must be of a relatively limited configuration, in order to permit the coupling means to function as intended. It is to the elimination of limitations such as these, and to the attainment of the other advantages, that the present invention is directed.

SUMMARY OF THE INVENTION

The present invention is directed to new and improved coupling means for use with a system and devices of Katz and Levitt, and more particularly is directed to an improved handling device and an improved container assembly embodying elements of the novel coupling means.

The novel coupling means of the invention comprises two principal elements, viz, an element secured to the positioning means of the handling device and an element secured to a container assembly, these elements being adapted in size and configuration for flexible, separable and cooperative interengagement to effect either a pushing or a pulling connection between the handling device and the container assembly in accordance with the system of Katz and Levitt. The element secured to the positioning means of the handling device generally comprises a hooking member in the general configuration of a claw of elongated width, and preferably mounted on said positioning means in a downwardly-opening position and in a manner so as to be limitedly rotatable about a generally vertical axis perpendicular to the axis of said positioning means.

When the coupling means of the present invention are employed, the handling device of Katz and Levitt must be modified at least to the extent of mounting the positioning means on the frame or support member so that the end portion thereof carrying the hooking member comprising an element of the coupling means is adapted for generally vertical movement relative to and independent of the positioning or carriage member or members and support member. Preferably, this is accomplished by mounting the positioning means on the device so as to be rotatable about a transverse axis through the forward portion thereof. Suitable elevating means also must be provided, in order to permit the vertical adjustment of the positioning means.

The element of the coupling means secured to said container assembly generally comprises a longitudinally-elongated receiving member rigidly secured to a side portion of the container assembly and comprising a longitudinally-extended lip of uniform transverse cross-section spaced outwardly from said side portion of the container assembly. The shapes of the interior surfaces of the hooking member and of the lip of the receiving member are such as to permit of cooperative yet separable interengagement and either in pushing or in pulling operations. Preferably, in accordance with the present invention the handling device is equipped with a pair of hooking members, and the container assembly is equipped with at least a pair of correspondingly-spaced receiving members on each of its longitudinal side portions. The invention also comprehends an improved container assembly having secured thereto one or more receiving members of the type hereinabove described, and which in addition to having a transverse lip portion interengageable with the claw portion of the hooking member on the handling device, also is provided with means adapted for cooperative and separable engagement with lifting means independent of said handling device.

In a preferred embodiment of the invention, the length of the lip portion of the receiving member is sufficiently greater than the width of the claw portion of the hooking member to accommodate a relatively large degree of parallel misalignment of such members in the horizontal plane. In addition, a relatively large degree of angular misalignment of such members in the horizontal plane is accommodated through the preferred feature of securing said hooking member to said positioning means through pivot means permitting limited rotation in a generally horizontal plane. In the preferred embodiment, angular misalignment of such members in a generally vertical plane is accommodate in large degree by the shape, size and orientation of the bearing surfaces in sliding contact during pushing or pulling relationship. In particular, the preferred embodiment of the coupling means of this invention provides limited flexibility much in the nature of a universal joint, the cooperation between engaging surfaces of hooking and receiving members being in the nature of a horizontally-extending hinge pin, and flexibility on a horizontal plane being provided by the generally-vertical pivot axis connecting the hooking member to the positioning means of the handling device. In addition, in a preferred embodiment, the specific matching contours of the lip and claw portions ensure that within a wide range of possible angular misalignment in the vertical plane (i.e., about 20 degrees), the contact between matching bearing surfaces is along a surface rather than a line or point, thus making possible the transmission of bearing forces of significantly greater magnitude, and, the area of contact is so oriented that the force transmitted by means of positioning means always intersects the central axes of both contacting surfaces. In the latter manner, maximum effectiveness in the transfer of such forces is achieved.

DETAILED DESCRIPTION OF THE INVENTION

In general, the coupling means of the present invention comprises two elements, namely: (1) a hooking member having a claw portion of special configuration, the hooking member being pivotally secured to the positioning means of the handling device; and (2) a receiving member having a lip portion of special configuration, the receiving member being rigidly secured to a side surface of the container assembly. The claw of the hooking member and the lip of the receiving member are adapted in size and configuration for cooperative interengagement, and, through the preferably matching contours of their respective surfaces of contact when so engaged, permit of the transmission of pushing or pulling forces to the container assembly in a dispersed and more flexible and efficient manner.

Figure 3:
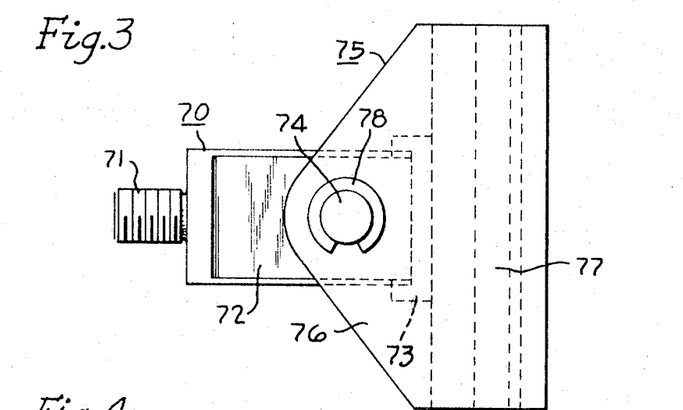
FIGURE 3 is a top plan view of a specific embodiment of the hooking members constituting one element of the coupling means of the invention, together with the adapter member suited for connecting same to the handling device.
Figure 4:
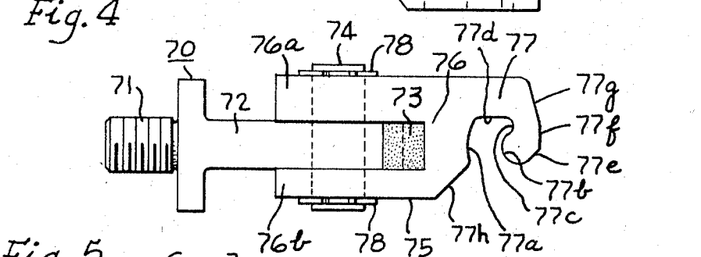
FIGURE 4 is a side elevational view of the hooking member and adapter member shown in FIGURE 3.
Figure 5:
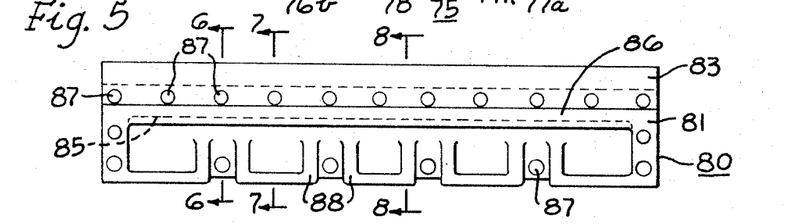
FIGURE 5 is a front elevational view of a specific embodiment of the receiving member constituting a second element of the coupling means of the invention.

A specific and preferred embodiment of the hooking member is shown in FIGURES 3 and 4, wherein the hooking member 75 comprises a transversely-elongated claw portion 77 and yoke portion 76 comprising yoke elements 76a and 76b. Preferably, the hooking member is adapted for mounting on the handling device through means permitting limited rotation of the hooking member about an axis generally perpendicular to its transverse and longitudinal axes, so as to accommodate limited angular misalignment between the hooking member and the receiving member. The hooking member 75 illustrated in FIGURES 3 and 4 is designed for connection to the handling device through adapter member 70. As shown in FIGURES 3 and 4, adapter member 70 comprises a generally cylindrical member having reduced, threaded portion 71 and flattened, tongue portion 72. Tongue portion 72 is adapted for insertion into yoke portion 76 of hooking member 75 between yoke elements 76a and 76b. Tongue portion 72 and yoke elements 76a and 76b are pivotally connected through pin 74 held in place by lock rings 78 or other suitable means such as cotter pins and the like. The space between the end of tongue portion 72 and the innermost wall of the recess formed by yoke elements 76a and 76b is occupied by spring member 73, which, as illustrated, is adapted by its U shape (FIGURE 3) to remain in position during normal operation. Spring member 73 is made from a resilient material, such as neoprene or other synthetic rubbers, and is, by virtue of its resistance to compression, adapted to maintain the hooking member 75 in its normal orientation while yet permitting of its limited rotation about pin 74 to accommodate limited angular misalignment between it and the cooperating receiving member located on the side of the container assembly.

As will be seen from FIGURE 4, claw portion 77 comprises opposing, uniformly-spaced, transversely-extending, interior concave and convex surfaces, 77a and 77b, respectively, connected by one or more relief surfaces such as shown at 77c and 77d. A plurality of outer relief surfaces, such as shown at 77e through 77g and 77h, serve to complete the contour of the claw 77. Concave surface 77a and convex surface 77b preferably are cylindrical and concentric, with their common central axis intersecting the longitudinal axis of the adapter member 70 and the positioning means of the handling device. Alternatively, surfaces 77a and 77b may be spaced apart a distance greater than required for concentricity, but in such event both central axes still intersect the longitudinal axis of adapter member 70.

In FIGURES 5, 6, 7 and 8, there is illustrated a specific and preferred embodiment of the receiving member constituting an element of the coupling means of the invention. This member is intended and suited for use with the hooking member 75 illustrated in FIGURES 3 and 4. In FIGURES 5, 6, 7 and 8, receiving member 80 is shown as a longitudinally-elongated member of irregular cross-section, comprising first transverse portion 81 adapted to be rigidly secured at a first side portion 82 to the surface of a container assembly or other article through fastening means 87, such as screws, bolts, rivets or the like, and comprising also second transverse portion 83 in the general configuration of a longitudinally-extending, projecting lip adjoining a second side portion 84 of transverse portion 81 and in spaced relation from first side portion 82 in order to provide a recess between lip portion 83 and the surface of the container assembly. The uninterrupted longitudinal length of lip 83 preferably is substantially greater than the over-all transverse width of claw 77 in order to accommodate significant lateral misalignment between hooking member 75 and receiving member 80. Optionally, but preferably, first transverse portion 81 also contains a third side portion 86 having longitudinally-extending recess 85 adapted for separable engagement with lifting means independent of the handling device. Receiving member 80 conveniently is made by casting, and preferably should include a plurality of longitudinally-spaced reinforcing ribs 88.

Figure 6:
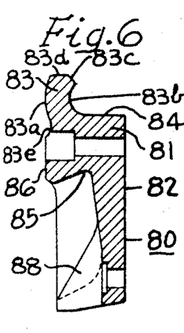
FIGURES 6, 7 and 8 are tranverse, cross-sectional views of the receiving member shown in FIGURE 5, along axes 6—6, 7—7 and 8—8, respectively.
Figures 7, 8:
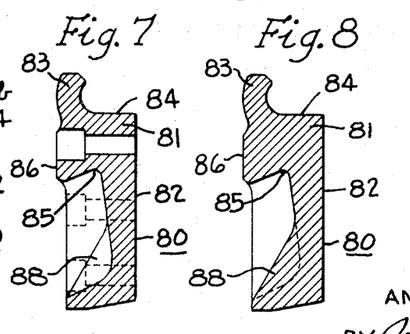

As shown in the cross-sectional views of FIGURES 6, 7 and 8, lip portion 83 comprises opposite, uniformly-spaced, longitudinally-extending convex and concave surfaces, 83a and 83b, respectively, connected by one or more distinguishable relief surfaces such as shown at 83c and 83d. Convex surface 83a and concave surface 83b preferably are cylindrical and spaced apart a distance less than required for concentricity. Alternatively, surfaces 83a and 83b may be concentrically spaced if an appropriate configuration is selected for the claw 77.

Figure 9A:
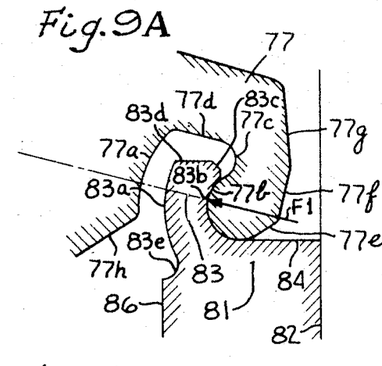
FIGURES 9A and 9B are enlarged, fragmentary, end views of portions of the same two particular coupling elements cooperatively interengaged for pulling and pushing, respectively, when the hooking member is being extended and retracted at a positive angle of approach, i.e., from above a line perpendicular to a vertical, longitudinal plane of the receiving member.
Figure 9B:
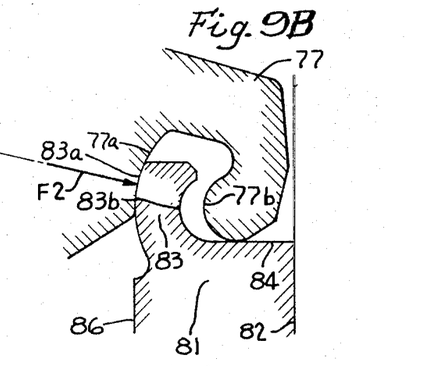

The respective portions of hooking member 75 and receiving member 80 which are in bearing contact during working engagement of the elements of the coupling means preferably are surfaces of generally-matching contours or configurations. In this manner, the substantial forces involved are transmitted over an area rather than through a line or point of contact. In the preferred specific embodiment of the coupling means which is shown in FIGURES 3 through 8, cylindrical concave surface 77a of claw portion 77 substantially matches in contour convex cylindrical surface 83a of lip portion 83 to provide a pair of matching surfaces which, upon bearing contact, are adapted to transmit a pushing force from the handling device. Similarly, convex cylindrical surface 77b of claw portion 77 substantially matches in contour concave cylindrical surface 83b of lip portion 83 to provide a pair of cooperating bearing surfaces for the transmission of a pulling force from the handling device. The other, connecting surfaces, such as surfaces 77c, 77d and 77h of claw portion 77, and surfaces 83c, 83d and 83e of lip portion 83, are of such size and configuration or contour as to avoid interference therebetween while permitting a significant degree of variation in the angular alignment between hooking member 75 and receiving member 80 when in operative engagement. This is illustrated in FIGURES 9A and 9B for the situation in which the hooking member 75 approaches the receiving member 80 at an angle generally above the horizontal plane of the illustration, and in FIGURES 10A and 10B for the situation in which the angle of approach generally is below such horizontal plane. Corresponding parts appearing in FIGURES 9A, 9B, 10A and 10B are in every instance referred to herein by the reference numbers respectively applied thereto in FIGURE 9A, although for the sake of clarity such reference numbers have in some instances been omitted from FIGURES 9B, 10A and 10B.

Figure 10A:
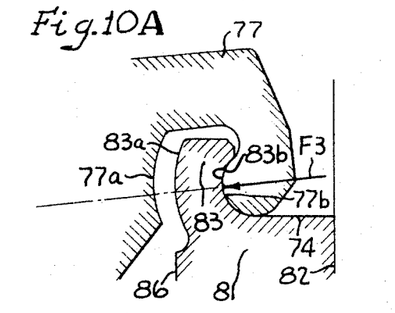
FIGURES 10A and 10B are enlarged, fragmentary, end views of the same portions cooperatively interengaged for pulling and pushing, respectively, when the hooking member is being extended and retracted at a negative angle of approach.
Figure 10B:
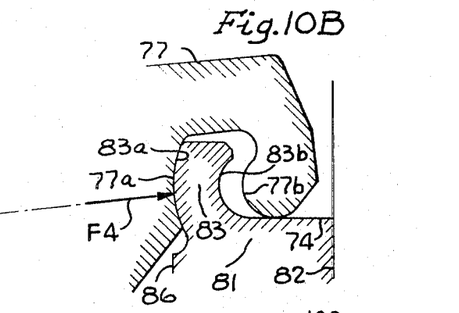

As shown in FIGURES 9A, 9B, 10A and 10B, the contours of the surfaces other than the bearing surfaces are such as to permit of some degree of variation in the orientation of the hooking member 75 to the receiving member 80 while in cooperative engagement. In addition, terminal exterior surfaces of claw portion 77, such as 77e through 77g, are of such size and configuration as to avoid interference with the side surface of the container assembly or other article to which is secured receiving member 80 along its side 82. Terminal exterior surface 77h of longitudinal yoke portion 76 likewise is of such a configuration and size as to avoid interference with opposing surface 83e of lip portion 83 during operative engagement. In FIGURES 9A and 10A, the elements are in pulling engagement, with pulling surfaces 77b of claw portion 77 in substantial contact with pulling surface 83b of lip portion 83 so as to transmit over and between such surfaces the pulling forces F1 and F3 (FIGURES 9A and 10A, respectively) applied colinearly with the longitudinal axis of the adapter member 70 and positioning means 35. In FIGURES 9B and 10B, the elements are in pushing engagement, with pushing surface 77a of claw portion 77 in substantial contact with pushing surface 83a of lip portion 83 so as to transmit over and between such surfaces the pushing forces F2 and F4 (FIGURES 9B and 10B, respectively) applied colinearly with the longitudinal axis of the adapter member 70 and positioning means 35. As noted above and as illustrated in FIGURES 3 through 10, bearing surfaces 77a and 77b of claw portion 77 are cylindrical and concentric, with their common central axis intersecting the longitudinal axis of adapter member 70 and positioning means 35. Likewise, bearing surfaces 83a and 83b of lip portion 83 are cylindrical, but spaced apart a uniform distance less than that required for colinearity of their parallel central axes. In this manner, substantial freedom of insertion and withdrawal is provided for lip portion 83 with respect to the recess of claw portion 77. Alternatively, the same freedom could be accompilshed by making concenrtic the bearing surfaces of lip portion 83 and spacing apart the bearing surfaces of claw portion 77 a distance greater than that required for their concentricity. Also alternatively, the cooperating portions of the two elements of the coupling means can be sized as to permit of interengagement through a lateral, telescoping movement rather than a generally-vertical insertion technique as above described.

Figure 2:
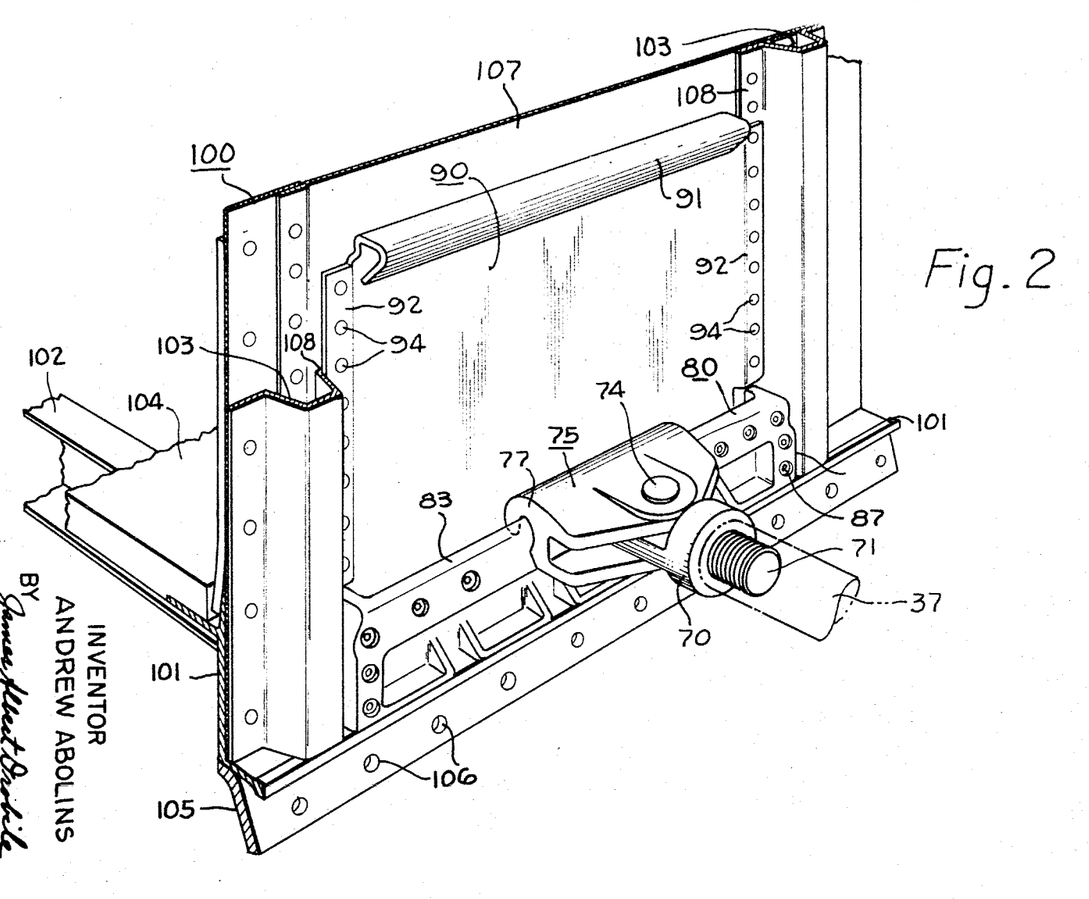
FIGURE 2 is an enlarged, fragmentary view in perspective showing, an interengagement, both elements of the specific coupling means illustrated in part in FIGURE 1, and showing the manner in which each such element can be secured respectively to the container assembly and to the handling device.

In FIGURE 2, one method of mounting receiving member 80 to the side surface of a container assembly 100 is illustrated. The construction of a typical container assembly is shown in FIGURE 2 in pertinent portion, and comprises bottom side rail 101 which runs longitudinally along the lower portion of each longitudinal side of a container assembly. Bottom rails 101 are connected at their inner faces to the adjacent ends of bottom transverse sills 102 which are located at longitudinally-spaced intervals along the underside of the container assembly. Sills 102 and bottom side rails 101 form a part of the underframing of the container assembly 100 and support floor panels 104. A plurality of vertically- and longitudinally-extending side panels 107 in partially-overlapping relation are secured to rails 101 in order to enclose the container assembly. Vertically-extending side reinforcing posts or ribs 103 are provided at spaced intervals along the sides of the container assembly 100 so as to cover and strengthen the side panel vertical seams. In FIGURE 2, receiving member 80 is shown mounted to the side surface of container assembly 100 between adjacent ribs 103, and adjacent the upper portion of bottom rail 101, where it is secured by fastening means 87 such as bolts and nuts. Preferably, a plate member 90 is interposed between the side panel 107 and receiving member 80, and extends upwardly for a substantial distance above the lip portion 83 of receiving member 80. Plate member 90 functions as a strike plate, to reduce the risk of damage to side panel 107 by operation of hooking member 75. Preferably, plate member 90 includes stiffening rib 91 at its uppermost portion, which conveniently is formed by curling the upper extremity of plate member 90 outwardly and downwardly around a generally-horizontal axis. As shown, the side portions 92 of plate member 90 are offset outwardly, so as to overlay the innermost flanges 108 of adjacent rib members 103 while yet permitting the central portion of plate member 90 to maintain a position flush with the exterior surface of side panel 107. Plate member 90 is fastened to the container assembly 100 by fastening means 94 extending through innermost flanges 108 of adjacent ribs 103 and side panels 107 of the container assembly. The offset side portions 92 of plate member 90 terminate at a point adjacent the upper surface of receiving member 80, so that the side portions of receiving member 80 can be fastened directly to flanges 108.

Figure 1:
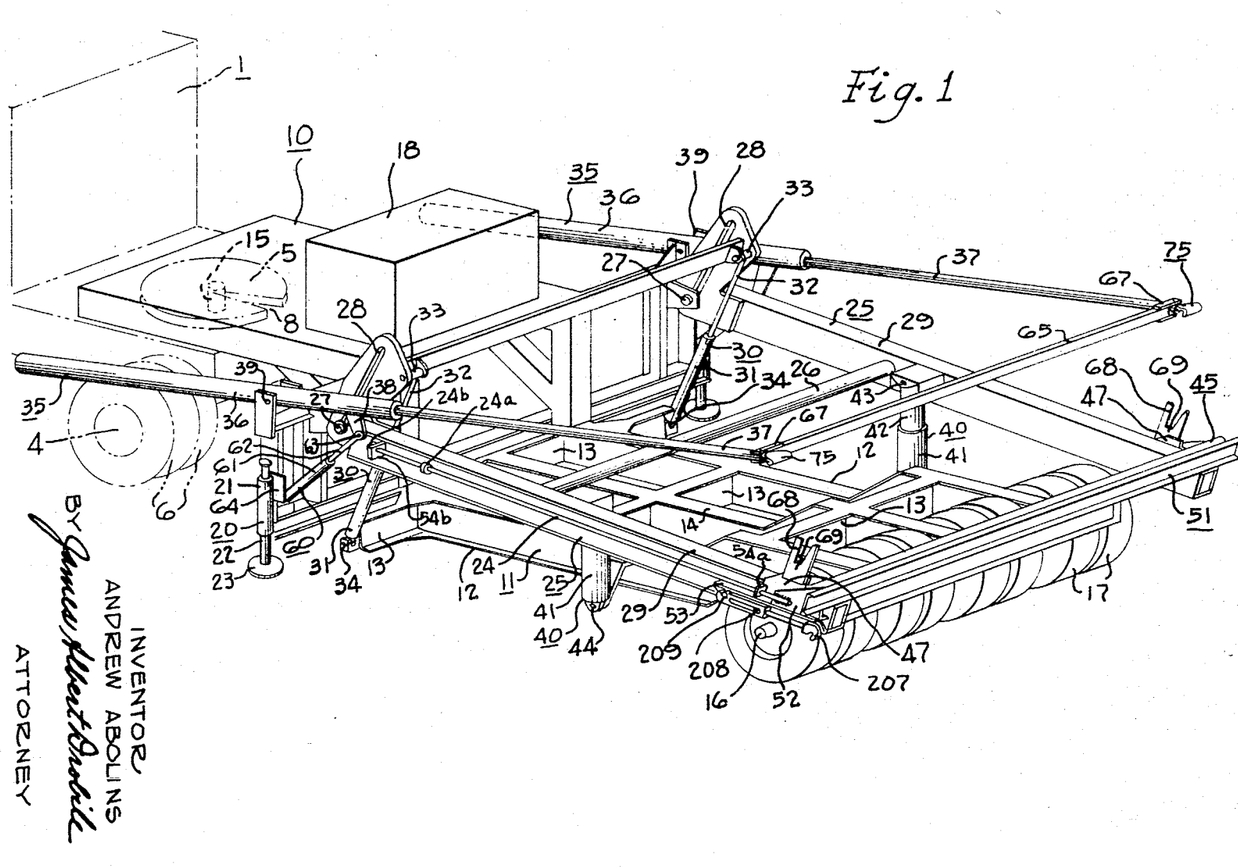
FIGURE 1 is a view in perspective of a particular container handling device according to the teachings of Katz and Levitt, which is equipped with a specific embodiment of the hooking member constituting one element of the coupling means of this invention.
Figure 14:
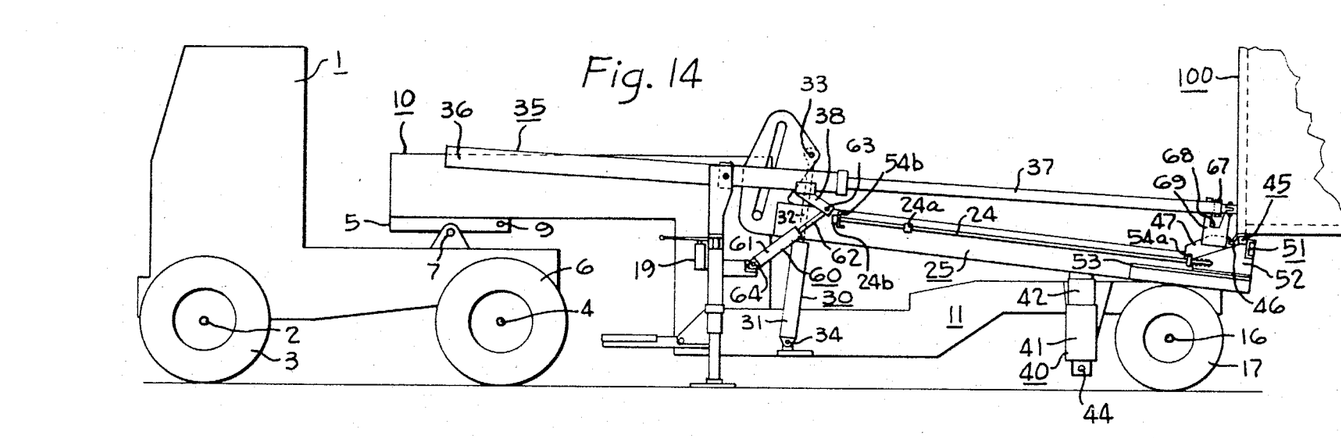
FIGURE 14 is a schematic view of a side elevation of the handling device of FIGURE 1 coupled with a tractor and of a fragmentary and elevation of a container assembly, showing the handling device in a position engaging the container assembly either preparatory to unloading same from the railroad car or other supporting structure (not shown) or after substantially completing the transfer of same to any such supporting structure.

In FIGURE 1, the hooking member heretofore illustrated in FIGURES 3 and 4 is shown mounted on a handling device generally in accordance with the teachings of Katz and Levitt, but embodying certain modifications necessary to the accommodation of such hooking member. As may be seen from FIGURE 1, the specific handling device 10 therein disclosed is adapted for use with independent motive power means such as tractor 1 shown in partial phantom outline. The device includes rigid frame 11 preferably having at the front portion of its under surface a downwardly-extending kingpin (shown in phantom at 15) which is adapted for releasable interengagement with a conventional fifth wheel assembly of the type typically used on a standard highway tractor. Such a fifth wheel assembly 5 is provided on the tractor shown in phantom in FIGURE 1, and is schematically illustrated from the side in FIGURE 14. In general, such a fifth wheel assembly 5 is equipped with a rearwardly-opening and outwardly-flaring slot 8 (FIGURE 1) for receiving the kingpin 15, and with locking means, shown in FIGURE 14 as transversely-extending pin 9, for releasably holding the kingpin 15 in position for operating purposes. The fifth wheel 5 typically is pivotally-mounted along a transverse axis, as also shown in FIGURE 14 at 7.

The frame 11 of the handling device shown in FIGURE 1 also is provided through its lower rear portion with a single transverse axle 16 having mounted thereon a plurality of wheels 17. The number and size of such wheels are governed by the load that the wheels are required to carry, and possibly also are influenced by legal requirements regarding the maximum permissible load per unit of roadway or other supporting surface.

The frame of the handling device shown in FIGURE 1 is constructed of a pair of laterally-spaced, vertically-extending, longitudinal side members 12 connected by a plurality of transverse members 13. Additional longitudinal members, such as 14, as well as additional transverse members, may be provided. The number, size and arrangement of all such members may be varied in accordance with good design practices and consistent with the selected materials.

Where independent motive power means such as a tractor is employed, the frame of the handling device should be provided with landing gear or other supporting means at its front portion. Such landing gear should be retractable and can be of conventional design and construction. Preferably, the frame is provided with adjustable stabilizing means at its front portion, to provide additional stability to the device during operation. Where independent motive power means such as a tractor is employed, the adjustable stabilizing means conveniently also can function as the supporting means in lieu of conventional landing gear. In FIGURE 1, the stabilizing and supporting means 20 are illustrated to consist of a pair of hydraulically-operated cylinder and piston-rod assemblies, one being attached at each side near the front portion of the frame 11. Each of these hydraulically-operated leveling means 20 comprises a cylinder 21 attached in a vertical position to the frame 11 and a piston 22 operating in said cylinder with a bearing plate 23 attached to its lower extremity. Projection of the piston 22 within the cylinder 21 is achieved by hydraulic pressure generated and transmitted through a conventional hydraulic system located on the frame and schematically shown at 18. Individual controls are provided for each cylinder as shown schematically at 19 (FIGURE 14). Retraction of the piston can be accomplished similarly by hydraulic means, or can be accomplished conveniently by mechanical or other means.

The particular handling device illustrated in FIGURE 1 also includes, as the support member, an assembly comprising two laterally-spaced, longitudinally-extending, parallel support arms 25, which provide support to the container assembly when on the handling device. As indicated for the support member, the top surfaces of these support arms 25 provide a smooth bearing surface in the form of a pair of smooth, laterally-spaced, longitudinally-extending, parallel rails 29. One end of each of the support arms 25 is shown as expanded in depth to accommodate a slot 28, and is rotatably mounted through such slot about a pivot member 27 integral with the frame. The pivot point of each arm 25 about the pivot member 27 is made adjustable, within the opening of the slot 28, by suitable pivot adjustment means 30 connected between the arm 25 and the frame 11. In FIGURE 1, such pivot adjustment means 30 is shown as a pair of hydraulically-operated cylinder and piston-rod assemblies, comprising cylinders 31 and piston rods 32 operating therein. Each of the pivot adjustment means 30 is mounted in a generally vertical position at opposing sides of frame 11, and is pivotally-connected, at its lower end to the frame 11 through pivot means 34, and at its upper end to its corresponding arm 25 through pivot means 33. Pivot adjustment means 30 are operated by hydraulic pressure from system 18 and are controlled by individual controls 19 (FIGURE 14). A single pivot adjustment means of similar type also could be utilized, rather than a pair of such means, as, for example, through provision of a transverse member connecting the pivoted ends of arms 25 and the connection of such single pivot adjustment means to that transverse member.

It should be noted that the fit of the pivot members 27 in the slots 28 is such as substantially to preclude longitudinal movement of the arms 25. Furthermore, as shown in FIGURE 1, the heads on pivot members 27 extend beyond the sides of the slots 28 and thus preclude lateral movement of the arms 25 by holding said arms substantially in and against the underlying shoulders of the pivot members 27. While not particularly critical, a generally vertical shape for the slots 28 as shown in FIGURE 1 is preferred in order to permit the other end of the arm 25 to remain in approximately the same transverse plane while the slotted ends are raised or lowered.

As also shown in FIGURE 1, support arms 25 are connected intermediate their ends by a transverse member 26. Other structural members can be provided, consistent with good design considerations.

Each of the support arms 25 is provided, intermediate its ends, with support arm elevating means 40, for varying the elevation of the rear portion of said arm 25 above the frame 11, or for rotating the arm about pivot member 27, or for both purposes. In FIGURE 1, such arm elevating means 40 are shown as a pair of cylinder and piston-rod assemblies, mounted on opposing sides of frame 11, and each of which consists of cylinder 41 and cooperating piston 42, and is pivotally-connected at its bottom to the frame 11 through pivot means 44, and at its top to its corresponding arm 25 through pivot means 43. Again, power means in the form of a hydraulic system 18 are provided for operation of the arm elevating means, and such arm elevating means are controlled individually by corresponding controls 19 (FIGURE 14).

Figure 11:
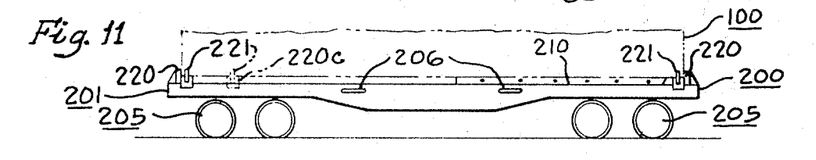
FIGURE 11 is a schematic side elevational view of a particular railroad car modified in accordance with the teachings of Katz and Levitt and having a typical container assembly mouted thereon.
Figure 12:
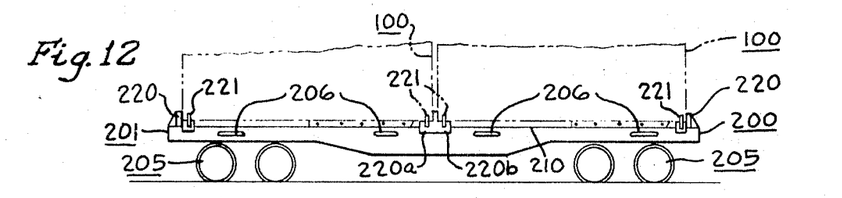
FIGURE 12 is a schematic side elevational view of a similarly-modified railroad car carrying two container assemblies.
Figure 13:
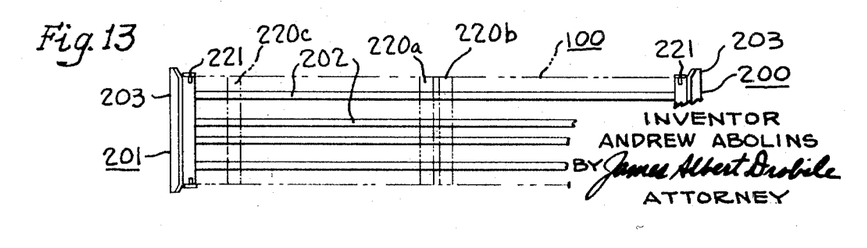
FIGURE 13 is a fragmentary top plan view of the frame of the railroad car illustrated in FIGURES 11 and 12, showing the locations of the several movable skid members of FIGURES 11 and 12 in phantom.

In FIGURE 1, each of support arms 25 is provided on its rear exterior side portion with a connector 207, slidably and rotatably mounted through a slot to pivot member 208 secured to the support arm 25. As shown in FIGURE 1, connector 207 is retracted in storage position, where it is prevented from rotative and accidental sliding movement by pin 209 secured to arm 25. When desired, connectors 207 can be extended rearwardly and maneuvered for separable engagement with a pair of correspondingly spaced stirrup members 206 or a railroad car 200 (FIGURES 11, 12 and 13). When so engaged, connectors 207 and stirrups 206 serve to maintain a fixed distance between the railroad car 200 and the handling device 10 and to resist the forces tending to separate or converge the device and the car during the transfer of a container assembly.

As noted above, a support member can be employed which consists of a structure or assembly comprising other than the pair of support arms hereinabove described. For example, a support member can be utilized comprising a horizontally-extending platform positioned above the frame, and mounted at its front portion to the frame through pivot means adapted to permit of rotation of the support member about a transverse axis and of elevational adjustment of the front portion of the support member with relation to the frame. In a manner similar to that described hereinabove with reference to the support arms, a support member in the form of a platform is equipped with rear and forward support member elevating means, which in function, and conveniently also in design and construction, correspond respectively to the support arm elevating means and pivot adjustment means hereinbefore described.

As noted above, the top surfaces of arms 25 constitute a pair of parallel, longitudinally-extending, laterally-spaced surfaces or rails 29. Slidably mounted on said rails 29, as shown in FIGURE 1, are two transverse positioning or carriage members 45 and 51. Forward positioning or carriage member 45 is provided at each end with suitable means, such as downwardly-extending plates 47 secured thereto, and adapted to maintain positioning or carriage member 45 in longitudinally-slidable, transversely-interlocking relation to said pair of rails 29. Positioning or carriage member 51 is provided at each end with suitable means, such as downwardly-extending plates 52 secured thereto, for ensuring longitudinally-slidable, transversely-interlocking movement in relation to said pair of rails 29. The selection of means, such as guide plates 47 and 52, will depend on the form of the support member which is employed. Positioning or carriage members 45 and 51 are limited in their rearward movement on the rails 29 by means hereinafter described.

Rear positioning or carriage member 51 can be adapted to move in relation to rails 29 either by sliding directly on such rails, or by sliding on a subsidary support. As shown in FIGURE 1, rear positioning or carriage member 51 is adapted to slide on longitudinally-extending shelves 53, matchingly secured to opposite arms 25. Movement by positioning or carriage member 51 with relation to rails 29 is more limited than that by positioning or carriage member 45. While not essential, where two positioning or carriage members are provided, they conveniently can be coupled together to provide for movement of the rear positioning or carriage member along with the forward positioning or carriage member after the latter has moved forwardly a desired distance. As shown in FIGURE 1, this relationship between rearward positioning or carriage member 51 and forward positioning or carriage member 45 is produced by means of longitudinally-extending rods 24, which are matchingly secured to the ends of rearward positioning or carriage member 51, and which project freely through apertures in the projections 54a matchingly mounted to plates 47 at the ends of forward positioning or carriage member 45, and through apertures in stop barriers 54b matchingly mounted on the support arms 25 near the front of the handling device. Each of rods 24 is provided at its forward end with enlargements or sleeves 24a and 24b which are securely fastened thereto rearward and forward, respectively, of stop barrier 54b. As will be seen, this arrangement permits of the two positioning or carriage members being positioned adjacent each other at the rear of the rails without interference from the rods 24, and permits of the limited forward movement of forward positioning or carriage member 45 to a point where side projections 54a on plates 47 come into contact with the enlarged portions or sleeves 24a securely fastened to rods 24. Following such contact, further forward motion of the forward positioning or carriage member 45 is accompanied by corresponding forward motion of the rear positioning or carriage member 51. Thus, positioning or carriage member 51 is limited in its longitudinal movement, rearwardly by the interference between sleeves 24b and stop barriers 54b, and forwardly by interference between sleeves 24a and stop barrier 54b.

In accordance with the present invention, handling device 10 is equipped with suitable positioning means 35 for varying the position of the hooking members 75 in relation to the support member 25. As shown in FIGURE 1, the positioning means 35 also is adapted to vary the longitudinal position of the forward transverse positioning or carriage member 45 on the rails 29 of the support member. In FIGURE 1, such positioning means 35 are shown as a pair of laterally-spaced, parallel, hydraulically-operated, push/pull power rams matchingly connected between the hooking members 75 and the forward portion of the frame 11. As so shown, positioning means 35 consists of hydraulic cylinders 36 pivotally-mounted intermediate their lengths to the front portion of the frame 11 through pivot pins 39, and cooperating piston rods 37 matchingly connected at their internally-threaded free ends to hooking members 75 through externally-threaded adapters 70 (FIGURE 2). In accordance with the teachings of Katz and Levitt, positioning means 35 are adapted for connection to the forward positioning or carriage member 45 through transverse bar 65 matchingly-connected at its ends to piston rods 37 through yoke members 67 which permit of rotation in a generally horizontal plane. Bar 65 and yoke members 67 also serve to prevent free rotation of rods 37 in cylinders 36. Forward positioning or carriage member 45 is provided at each of its ends with means such as vertically-extending plates 69 secured thereto and having upwardly-opening notches 68 adapted to releasably receive bar 65 in a position such that pushing or pulling forces applied by positioning means 35 can be transmitted through bar 65 and end plates 69 to forward positioning or carriage member 45. The size and shape of the openings 68 and end plates 69 are such as freely to permit of the insertion therein or removal therefrom of bar 65 in a generally vertical direction.

As also shown in FIGURE 1, in order to accommodate the coupling means of the present invention, each of positioning means 35 is provided, intermediate the pivot member 39 and the yoke member 67, with elevating means 60, for varying the elevation of the rear portion of piston rod 37 and connected yoke member 67 and bar 65 by elevation of the positioning means about pivot member 39. In FIGURE 1, such elevating means 60 are shown as a pair of cylinder and piston rod assemblies, each of which consists of cylinder 61 and cooperating piston 62 and is pivotally-connected at its bottom to the frame 11 through pivot means 64, and at its top to its corresponding positioning means 35 through pivot means 63 and link 38 rigidly secured to said positioning means. Again, power means in the form of a hydraulic system 18 are provided for operation of the elevating means 60, and such elevating means are controlled individually by corresponding controls 19 (FIGURE 14). Positioning means 35 also operate through application of hydraulic pressure from hydraulic system 18 and individual controls 19. Suitable means may be provided to maintain the hooking member 75 during movement in an orientation relative to each other which is generally parallel to their original relationship. Optionally, the positioning means 35 may be mounted inboard (not shown) of the frame 11 or on the support arms 25 (not shown). In addition, positioning means other than hydraulically-operated cylinder and piston-rod assemblies can be used. For example, means (not shown) comprising a pair of mechanical screws operating in a pair of internally-threaded cylinders or collars can be used, as can means comprising a parallel pair of chains or cables mounted on appropriately-located sprockets or sheaves and forming a parallel pair of endless chains or cables in conjunction with said hooking members 75 and forward positioning or carriage member 45.

Figure 15:
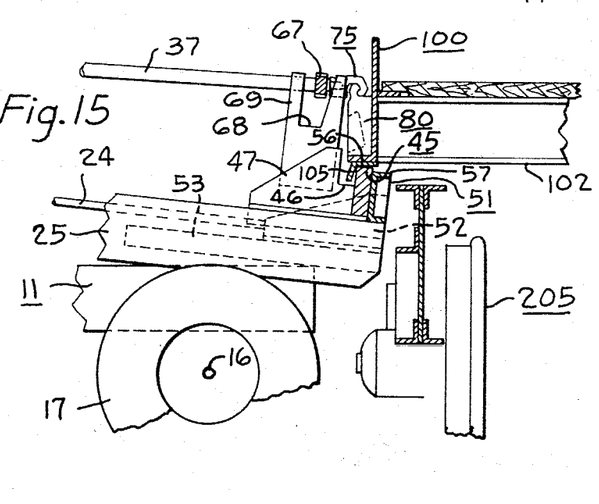
FIGURE 15 is an enlarged, fragmentary, cross-sectional view showing the interengagement between the elements of the coupling means of the invention, and showing the operative position of the carriage members of the handling device just prior to removal of the container assembly from the railroad car.

Coupling elements are provided on positioning means 35 for separable interengagement with cooperating coupling elements mounted on container assembly 100. In FIGURE 1, hooking members 75 constituting one element of the coupling means are illustrated at matchingly mounted on the free ends of piston rods 37 by adapter members 70 (FIGURE 2) each consisting of externally-threaded portion 71 adapted to screw into the internally-threaded end portion of rod 37 and having tongue portion 72 adapted for insertion in hooking member 75 between yoke elements 76a and 76b where it is pivotally retained by pin 74. FIGURE 2 shows schematically and in perspective the detail of the interengagement of the hooking member 75 mounted on rod 37 and the receiving member 80 mounted on a container assembly. FIGURE 15 shows schematically and in enlarged fragmentary section the detail of the interengagement of the coupling means and the detail of the engagement of the positioning or carriage members 45 and 51 with the lower portion of container assembly 100. In FIGURE 15, forward transverse positioning or carriage member 45 is shown as embodying an included transverse valley 46, provided to accommodate without interference longitudinal "track angle" 105 (FIGURE 2), hereinafter described.

When positioned as illustrated in FIGURE 15, the upper horizontal surface 56 of the rear portion of forward positioning or carriage member 45 is in lifting or supporting contact with the horizontal under surface of track angle 105, and the upper horizontal surface 57 of the rear positioning or carriage member 51 is below but not yet in contact with the under surface of sills 102. When container assembly 100 is moved by being pushed or pulled through the interengaged coupling means of the present invention, the forward positioning or carriage member 45 is adapted to move correspondingly while supporting the near side of the container assembly and protecting its track angle 105. In the absence of container assembly 100, carriage member 45 can be selectively positioned on rails 29 through operation of positioning means 35 and contact between plates 69 and bar 65 positioned in notches 68. As described above, carriage member 51 is actuated by rods 24.

Figure 19:
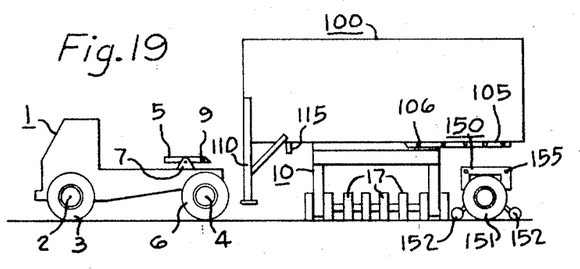
FIGURE 19 is a schematic elevational view of the side of a container assembly and of the end of a supporting handling deivce, with the former in position to be lowered onto a highway wheel assembly positioned thereunder and either landing gear or tractor.

As can be seen from reference to FIGURE 19, the container assembly 100 to which the present invention is applicable is provided at the front portion of its under surface with a downwardly-extending kingpin 115 and a retractable landing gear 110, the latter being extendable to the ground in order to support the front portion of said assembly when it is not supported by other means such as a tractor. Similarly the container assembly 100 is equipped at the rear portion of its under surface with means 105 for positioning a highway wheel assembly 150 in a predetermined longitudinal position underneath said container assembly. In FIGURE 19, said means for positioning comprises a pair of parallel, longitudinal members 105, commonly termed "track angles," which are mounted at the rear portion of the under surface of said assembly, and adjacent the sides thereof. The cross-section of members 105 is in the shape of an obtuse angle, and they are mounted underneath the container assembly so that the generally vertical leg of the angle extends downwardly and outwardly, as shown in FIGURE 15. Members 105 are provided throughout their length with a series of longitudinally-spaced, matching holes 106, which are adapted for releasable interengagement with transversely-movable pins 155 constituting locking means on the upper surface of highway wheel assembly 150 for releasably holding said wheel assembly 150 in said predetermined longitudinal position underneath the container assembly 100. Positioning means 105 permit of a longitudinally-slidable, laterally-interlocking engagement with the matchingly-configured upper portion of the cooperating highway wheel assembly 150.

The container assembly 100 to which the system of the present invention is applicable includes both the type in which the container and the retractable landing gear, kingpin and "track angles" or other positioning means for the wheel assembly form an integral assembly, such as in a conventional removable-bogey highway trailer body, and also the type in which the container is separable from an underlying chassis which is equipped with the kingpin, landing gear and positioning means for the wheel assembly. The device and rail car of the present invention also may be utilized beneficially with a separable container wholly independent of the aforementioned chassis.

As may be seen in FIGURE 19, the highway wheel assembly or "bogey" 150 is of generally conventional design. As shown, it is equipped with a single axle, road wheels 151, and stabilizing members 152. Also, there is mounted on its upper surface conventional locking means, comprising pins 155, adapted for releasable interengagement with the holes 106 in positioning means 105.

As indicated in FIGURE 1, the motive power means provided for the handling device 10 conveniently is a separable tractor 1 of generally conventional design, having a chassis with rear axle 4 and rear wheels 6, and steerable wheels 3 mounted on axle 2 in the front (FIGURE 19). In addition, as is customary, there is provided at the upper surface of the rear portion of the tractor a fifth wheel 5 (shown in phantom in FIGURE 1) having a rearwardly opening slot 8 for receiving a kingpin of the type hereinbefore mentioned as being on the container assembly 115 and preferably on the handling device 15. The fifth wheel 5 also has a conventional latching means, shown in FIGURES 14 and 19 as movable pin 9, for locking the kingpin at the inner end of the slot 8 directly above the rear axle 4 and wheels 6. As also is customary, the fifth wheel 5 is pivotally mounted by suitable means such as pivot members 7. Although not essential to the practice of the present invention, the fifth wheel may be mounted on a frame which is adjustable vertically by suitable means (not shown) such as a hydraulic cylinder. While a tractor of conventional design but of special dimensions may be employed in cooperation with the handling device of this invention, it is preferable to employ tractors of standard or interchangeable design and dimensions for use both with the handling device and the container assembly. In fact, the very same tractor may be used successively to move the handling device and the container assembly mounted on the bogey, and vice versa.

The railroad car constituting one component of the system of the present invention may include elements for supporting either a single container assembly or more than a single container assembly, depending upon the size of the container assemblies and other factors. In FIGURE 11, a railroad car is shown as supporting a single container assembly (in phantom), while in FIGURE 12 the railroad car is shown as handling two such container assemblies. Even more than two, e.g., four, container assemblies can be handled by a single railroad car.

As may be seen by reference to FIGURES 11, 12 and 13, the railroad car 200 in general comprises a rigid frame 201 which typically is constructed from a plurality of longitudinal members 202 and of transverse members 203 located at least at the ends of said frame 201 and also (not shown) over the trucks 205. As illustrated in FIGURE 13, and forming a particular embodiment of this invention, the longitudinal frame 201 of the railroad car 200 is in width substantially less than the overall width of the container assembly 100 (shown in broken outline) which it is designed to carry. However, a distinct advantage of the coupling means of the present invention resides in the fact that a railroad car having a width equal to or greater than that of the supported container assembly 100 can be accommodated. The railroad car is shown in FIGURES 11, 12 and 13 as having conventional railway trucks 205 located at the end portions of the frame 201. Such trucks can be of any suitable design and construction.

As also may be seen by reference to FIGURES 11, 12 and 13, the railroad car 200 is provided with at least a pair of longitudinally-spaced stirrup members 206 securely mounted on each side of frame 201 at the upper portion thereof. In spacing, stirrup members 206 correspond to hook members 207 provided on handling device 10, and such hook members 207 and stirrup members 206 are adapted for releasable engagement to facilitate alignment and to maintain proper spacing, and serve as a releasable connecting link, between the railroad car 200 and the handling device 10.

As may be seen by reference to FIGURE 11, the railroad car 200 is provided at its upper portion with a pair of parallel, transverse, longitudinally-spaced, horizontal end or terminal skid members 220 adapted for holding single container assembly 100 in transversely-slidable, substantially longitudinally-interlocking relation to said skid members 220, and in a position elevated above the upper surface 210 of the rail car 200 in order to avoid interference between said upper surface and the track angle, kingpin and landing gear or other elements which depend downwardly from the under surface of said container assembly 100. The skid members 220 are either permanently or separably mounted to the upper portion of said rail car 200, which railroad car including the upper portion thereof can be equipped with suitable shock absorption means to protect the container assembly and its contents from damage. As shown in FIGURES 11 and 12, the terminal skid member 220 can be generally L-shaped in cross-section, and then are mounted in toe-to-toe relationship. However, any cross-section and dimensioning which permits of the desired relationship, as above described, is satisfactory.

More than a single pair of skid members may be provided on the upper surface of the railway car 200. For example, when the container assembly 100 is of the type embodying a round-nosed container or trailer body, it is desirable to insert a third skid member 220c, parallel to and intermediate the two terminal skid members 220, underneath the container or trailer body at a location approximating the achievement of full width in the container or trailer body. Such an intermediate skid member 220c is shown in FIGURES 11 and 13, and conveniently is uniformly rectangular in cross-section and separably and adjustably mounted on rail car 200. Furthermore, as is shown in FIGURES 12 and 13, when two container assemblies are to be mounted on a single railway car, a unitary, double-terminal skid member 220a–b can be conveniently employed to provide support in common for the two ends coming together at the central portion of the car or, alternatively, two separate terminal skid members 220a and 220b can be employed. As shown in FIGURE 12, this double-terminal skid member 220a–b has a cross-section in the shape of an inverted T, and is adapted to maintain the container assemblies in substantially the same elevated position as are the terminal skid members 220. This double-terminal skid member 220a–b may be permanently, or separably and adjustably, fastened to the upper surfaces of the railway car 200.

As shown in FIGURES 11, 12 and 13, on the end of each skid member and in a position extending above the top of the skid member and inwardly over a portion of the lower side rail 101 (FIGURE 2) of the container assembly 100, there are provided removable clamps 221 for releasably locking the container assembly 100 in a fixed lateral position on the railway car for transit thereon. Other means suitable for releasably locking the container assembly in such position can be employed.

The sequence of operations in the system for transferring a container assembly from a railway car to a highway wheel assembly, and vice versa, utilizing the coupling means of the present invention, now will be described with reference to FIGURES 14, 16, 17, 18 and 19.

In FIGURE 14, the handling device 10 is shown schematically in side elevation in a position alongside and generally perpendicular to railroad car 200 (not shown) with container assembly 100 mounted thereon and shown schematically in fragmentary end elevation. The handling device 10 has been moved into such position by means of tractor 1 shown connected to the handling device 10 through fifth wheel 5 mounted on the tractor 1 and kingpin 15 (not shown) mounted on the front underside of handling device 10. As also shown in FIGURE 14, the rear ends of support arms 25 previously have been lowered by operation of arm elevating means 40 to a point where the transverse supporting elements of positioning or carriage members 45 and 51, when extended rearwardly substantially to the ends of rails 29 by positioning means 35, are adjacent and just underneath the near side portion of container assembly 100. In this position, hooking members 75 (not shown) can be positioned for interengagement with receiving members 80 (not shown) on container assembly 100 by operation of positioning means 35 and elevating means 60. The preceding discussion principally with reference to FIGURE 15 describes the initial operative positions of positioning or carriage members 45 and 51, and shows the manner in which carriage member 45 is placed in a position to support and carry the near side portion of the container assembly 100 during the initial stages of the pulling action.

Figure 16:
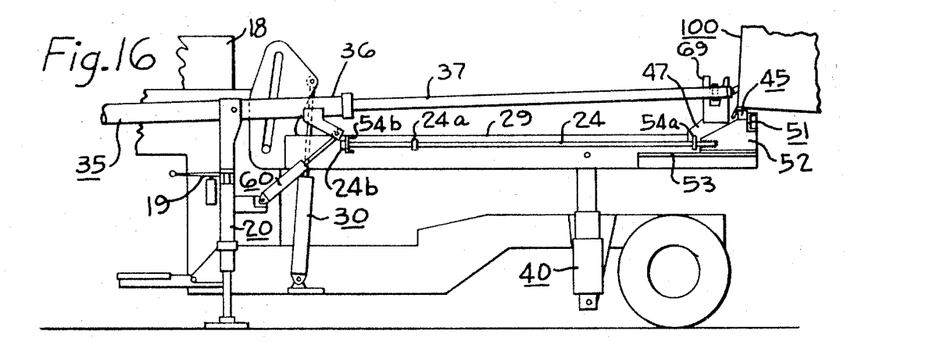
FIGURES 16, 17 and 18 are schematic, fragmentary views showing the handling device in side elevation and the container assembly in end elevation, and illustrating, in conjunction with FIGURE 14, the steps in the method of transferring the container assembly from the railroad car to the handling device, and vice versa, including the operation of both carriage members.
Figure 17:
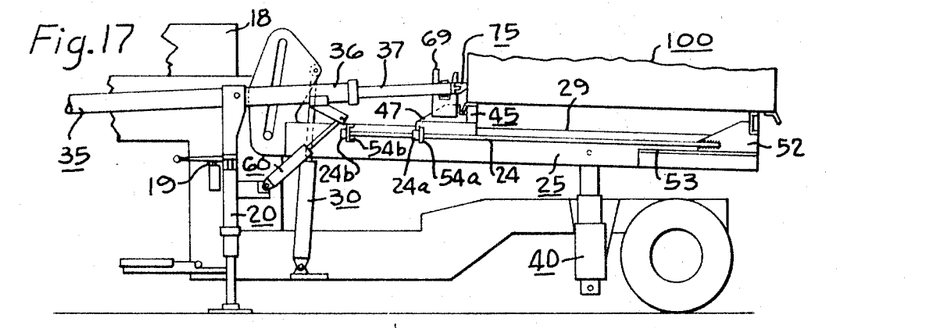
Figure 18:
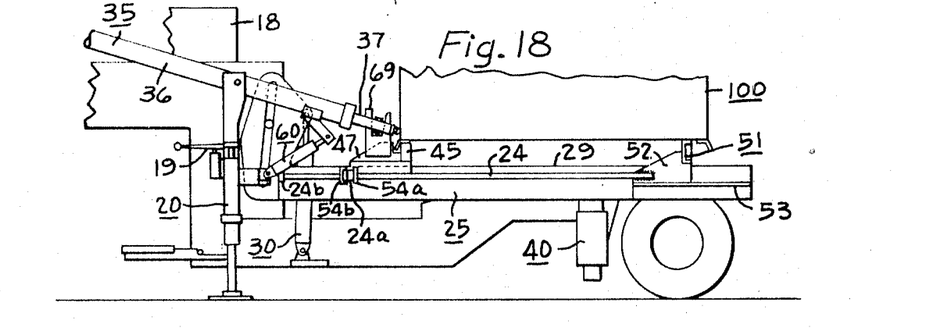

As shown in FIGURE 16, positioning or carriage members 45 and 51, located at the ends of the rails 29, can be elevated by arm elevating means 40 to a position raising the near side portion of the container assembly 100 just off of the surface of the skid members (not shown) of the railroad car. In this position, and with the coupling means interengaged (FIGURE 15), the container assembly 100 can be slid on its far side portion in a transverse direction along the skid members of the railroad car and progressively onto the support arms 25 by retraction of the positioning means 35. In this movement, the near side portion of the container assembly is supported by forward positioning or carriage member 45, which undergoes a corresponding sliding movement along the rails 29. After the container assembly 100 is in the position shown in FIGURE 7, i.e., substantially completely removed from railroad car 200 and supported by the support arms 25, either or both pivot adjustment means 30 and arm elevating means 40 can be appropriately operated to level and either raise or lower the supported container assembly 100, for example to the lowered position shown in FIGURE 18. As is also illustrated in FIGURE 18, additional movement of the supported container assembly 100 relative to the railroad car 200 can be achieved by continued retraction of positioning means 35 so as to cause a further withdrawal of container assembly 100 through operation of rear positioning or carriage member 51, which is adapted for a limited longitudinal movement along and on supporting shelves 53. As heretofore noted, forward (i.e., pulling) movement of rear positioning or carriage member 51 is produced by a pair of linking rods 24, each of which is rigidly secured at its rear end to end plate 52 of rear positioning or carriage member 51 and projects slidably through an aperture in projection 54a mounted on the end plate 47 of forward positioning or carriage member 45 and through an aperture in projection 54b mounted on support arm 25. In operation, forward movement of rear positioning or carriage member 51 is actuated by forward positioning or carriage member 45 only when member 45 has advanced forwardly on rails 29 to a position where projections 54a engage rear collars 24a secured to rods 24. When so engaged, further forward movement of the forward positioning or carriage member 45 produces, by the pulling foce transmitted through rods 24, a corresponding movement of rear positioning or carriage member 51 up to a limit marked by interference of rear collars 24a with projections 54b, which position is shown in FIGURE 8. If necessary or desirable, the handling device 10 with the supported container assembly 100 also can be moved relative to the railroad car 200 through operation of the tractor 1 or other motive power means.

FIGURE 19 schematically shows container assembly 100 in essentially the same supported position as that shown in FIGURE 18, but viewed from the side of the container assembly and looking from the rear end of the handling device 10. In addition, in FIGURE 19 the highway wheel assembly 150 has been positioned underneath the rear portion of the container assembly 100 and the retractable landing gear 110 on assembly 100 has been lowered. Upon further lowering of the container assembly 100 supported on support arms 25 through appropriate operation of any or all of pivot adjustment means 30, arm elevating means 40 and, if necessary, also stabilizing and supporting means 20, the container assembly 100 is placed on the highway wheel assembly 150 in a position permitting interengagement of track angle positioning means 105 and pin locking means 155. In this position, also, the front portion of the container assembly 100 is supported by retractable landing gear 110. Subsequently, the hooking members 75 can be disengaged and withdrawn from the receiving members 80 by operation of elevating means 60 and positioning means 35, and the support arms 25 and the positioning or carriage members 45 and 51 can be further lowered, again through appropriate operation of any or all of means 20, 30 and 40, to a position permitting free withdrawal of handling device 10 from its position under the container assembly. Withdrawal is accomplished through operation of the tractor 1. If desired, tractor 1 can be disengaged from the handling device 10, and can be repositioned to permit of its connection with container assembly 100. In the latter manner, container assembly 100 is placed in condition for highway transit.

When the system and devices of the present invention are utilized to transfer a container assembly from a highway wheel assembly and either lowered landing gear or a tractor, to a mounted position on the railroad car, the same operations are performed, but in generally reverse sequence.

It will be seen that the coupling means of the present invention constitutes an improvement in the handling device and system of Katz and Levitt as disclosed in their aforementioned patent application. By way of example, and in contrast to the coupling means disclosed by Katz and Levitt, the coupling means of the present invention (1) does not require a railroad car wherein the over-all width is limited in relation to that of the container assembly, and (2) is not limited in its usefulness to container assemblies having a particular type and pattern spacing in the location of the transverse sills forming a part to the understructure of the container assembly. In addition, the coupling means of the present invention is substantially more flexible in operation, and is adapted to accommodate significantly greater misalignments with the container assembly, than is the coupling means disclosed by Katz and Levitt. Furthermore, the coupling means of the present invention is adapted by virtue of its novel design characteristics to transmit the desired forces with increased efficiency and a minimum of non-uniformity in stress distribution. Other advantages and variations in the present coupling means as well as other applications thereof will be apparent to those skilled in the art. It is intended that all such variations be included within the scope of the present invention.

The invention claimed is:

1. Coupling means for separably connecting a first body to a second body and adapted to transmit pushing and pulling forces therebetween, said coupling means comprising, in combination: (A) a hooking member having a longitudinal first axis, first and second longitudinal portions, said second longitudinal portion being adapted for mounting to said first body through intermediate connecting means permiting limited rotation about a second axis perpendicular to and intersecting said longitudinal first axis, said first longitudinal portion being in the general configuration of a claw of elongated width and defining an elongated concave opening of uniform cross-section having an axis perpendicular to said first and second axes, the surface of said opening comprising a convex first pulling surface and a concave first pushing surface in generally opposing, spaced relationship, said first pushing and first pulling surfaces being cylindrical and having their central axes intersect said longitudinal first axis; and (B) a longitudinally-extended hooked-receiving member having first and second transverse portions, said second transverse portion being adapted for rigid mounting at a first side thereof to said second body, and said first transverse portion being generally in the configuration of a lip projecting from a second side of said second transverse portion at a position spaced from said first side thereof, said lip being of uniform cross-section and extending longitudinally for a distance substantially greater than the width of said claw, the exterior surface of said lip comprising a convex second pushing surface and a concave second pulling surface in opposing, spaced relationship, said second pushing and second pulling surfaces being cylindrical and having radii substantially identical to those of said first pushing and first pulling surfaces, respectively, the opening of said claw being adapted to fit over said lip and said first and second pushing surfaces and said first and second pulling surfaces being adapted for cooperation in sliding contact to permit of separable and flexible connection of said first and second bodies in a pushing and pulling relationship.

2. Coupling means according to claim 1 wherein said cylindrical first pushing surface and said cylindrical first pulling surface are concentric.

3. Coupling means according to claim 1 wherein said second transverse portion of said hook-receiving member is adapted at a third side thereof for releasable engagement with lifting means.

4. Coupling means for separately connecting a first body to a second body and adapted to transmit pushing and pulling forces therebetween, said coupling means comprising, in combination: (A) a hooking member having a longitudinal first axis, first and second longitudinal portions, said second longitudinal portion being adapted for mounting to said first body, said first longitudinal portion being in the general configuration of a claw and defining an elongated opening of uniform cross-section having an axis perpendicular to said first axis, the surface of said opening comprising a first pulling surface and a first pushing surface in generally opposing, spaced relationship; and (B) a longitudinally-extended hook-receiving member having first and second transverse portions, said second transverse portion being adapted for rigid mounting at a first side thereof to said second body, and said first transverse portion being generally in the configuration of a lip projecting from a second side of said second transverse portion, said lip being of uniform cross-section and extending longitudinally for a distance substantially greater than the width of said claw, the exterior surface of said lip comprising a second pushing surface and a second pulling surface in opposing, spaced relationship, the opening of said claw being adapted to accommodate said lip and said first and second pushing surfaces and said first and second pulling surfaces being adapted for cooperation in sliding contact to permit of separable and flexible connection of said first and second bodies in a pushing and pulling relationship.

5. Coupling means according to claim 4 wherein both said first pulling surface and said first pushing surface are concave and both said second pulling surface and said second pushing surface are convex.

6. Coupling means according to claim 4 wherein both said first pulling surface and said first pushing surface are convex and both said second pulling surface and said second pushing surface are concave.

7. Coupling means according to claim 4 wherein both said first pulling surface and said second pushing surface are concave and both said first pushing surface and said second pulling surface are convex.

8. Coupling means according to claim 4 wherein both said first pulling surface and said second pushing surface are convex and both said first pushing surface and said second pulling surface are concave.

References Cited

UNITED STATES PATENTS

| 3,144,149 | 8/1964 | Dempster et al. | 214—505 |
| 3,164,262 | 1/1965 | Price et al. | 214—43 X |

ALBERT J. MAKAY, Primary Examiner

U.S. Cl. X.R.

214—516; 254—93

UNITED STATES PATENT OFFICE
CERTIFICATE OF CORRECTION

Patent No. 3,460,862 August 12, 19

Andrew Abolins

It is certified that error appears in the above identified patent and that said Letters Patent are hereby corrected as shown below:

Column 19, line 17, "separately" should read -- separabl

Signed and sealed this 27th day of October 1970.

(SEAL)
Attest:

Edward M. Fletcher, Jr.
Attesting Officer

WILLIAM E. SCHUYLER,
Commissioner of Pate